United States Patent Office 3,541,224
Patented Nov. 17, 1970

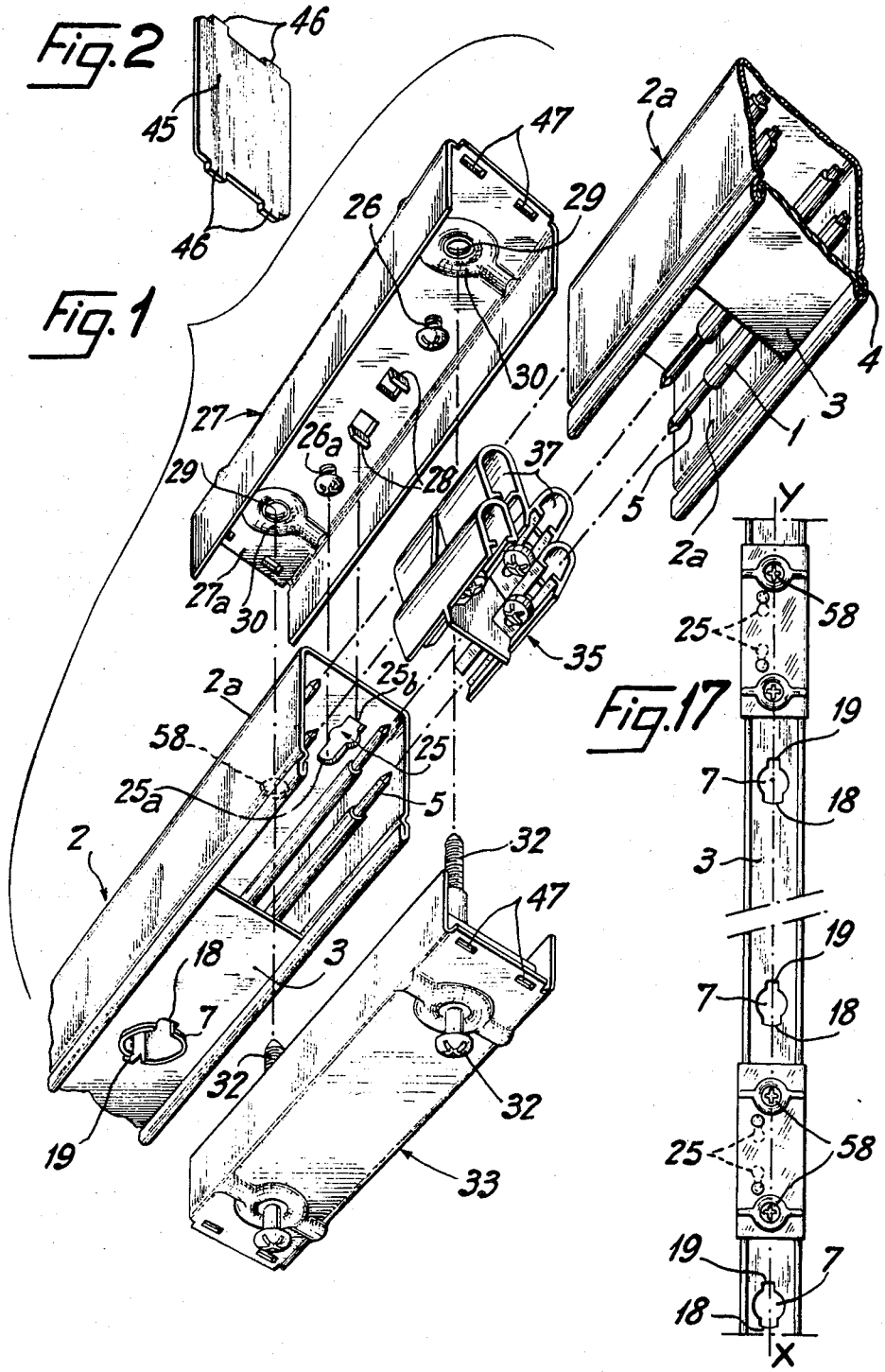

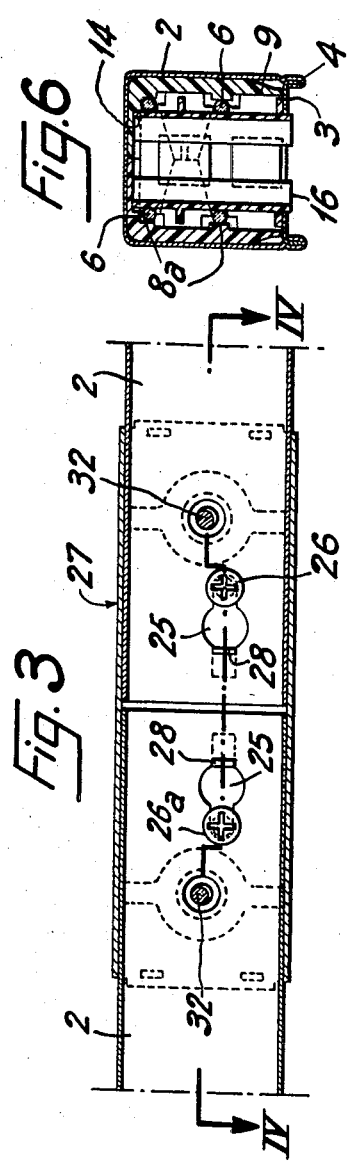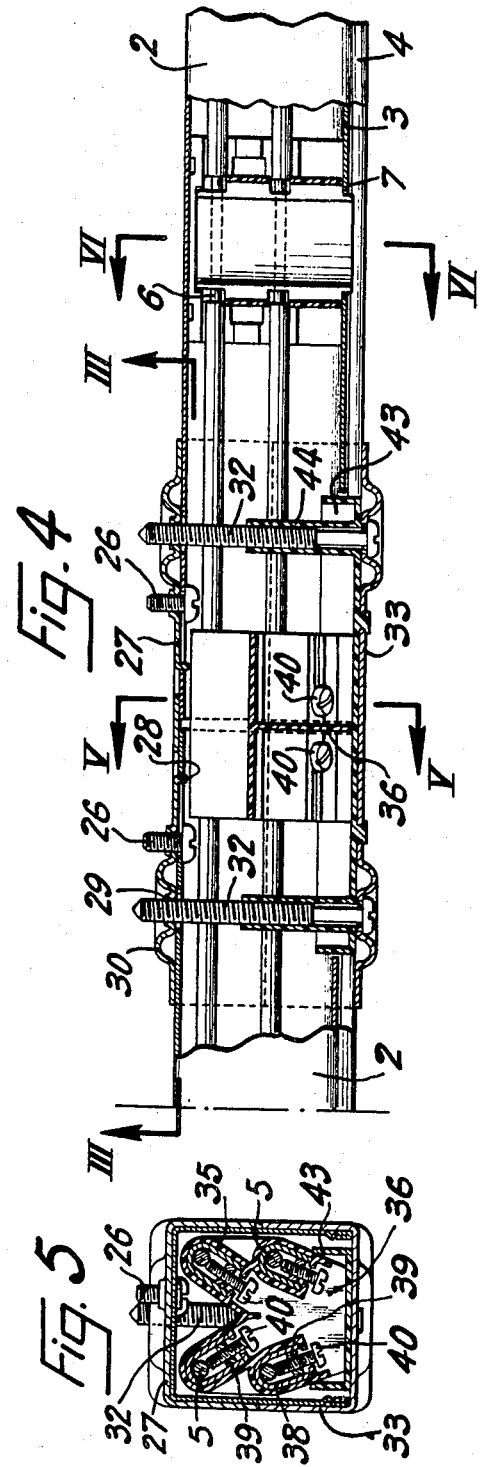

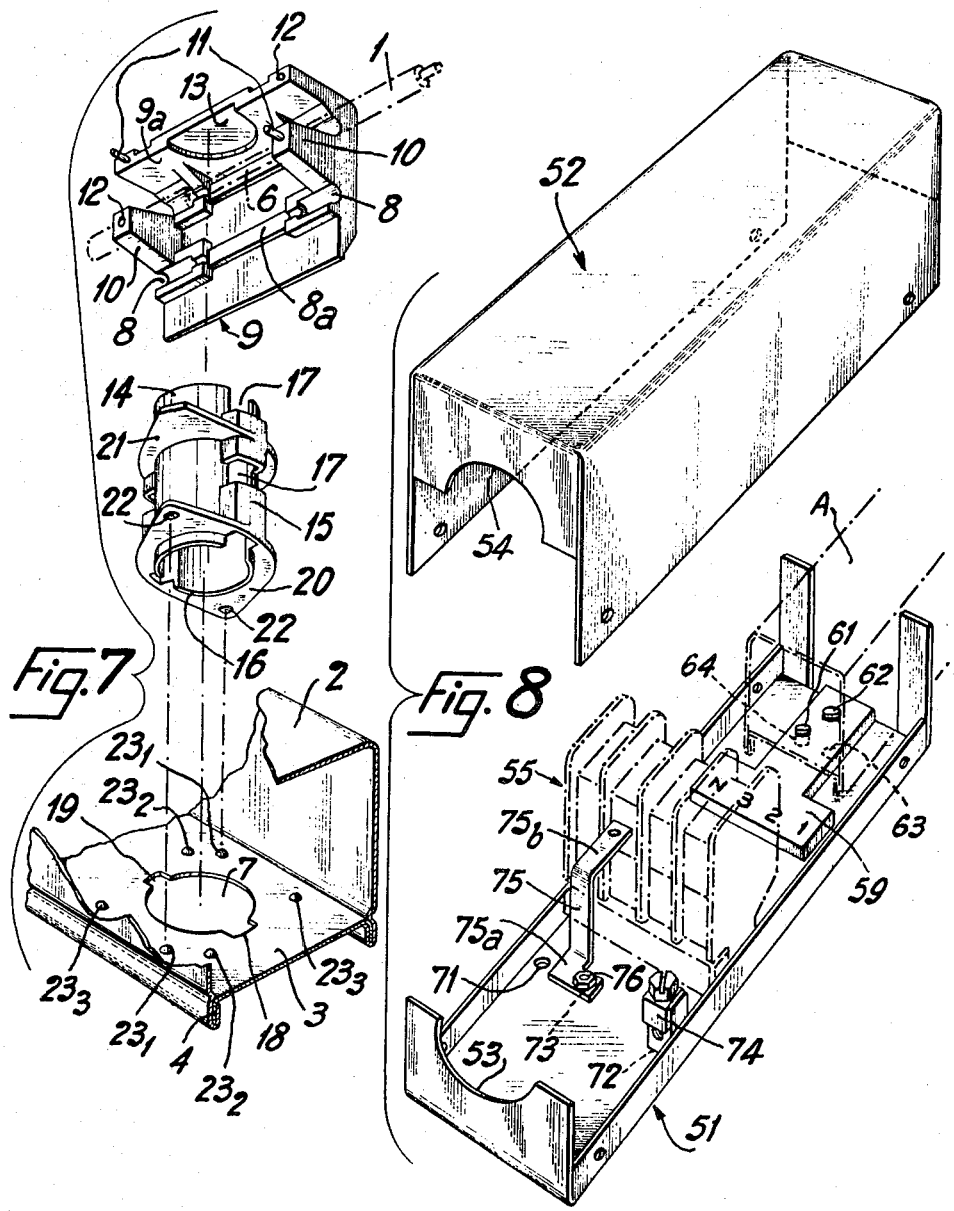

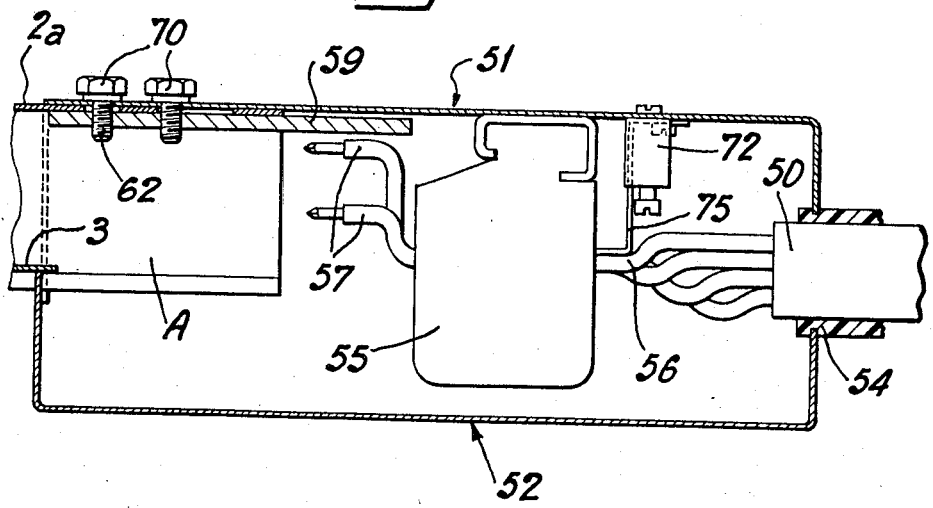
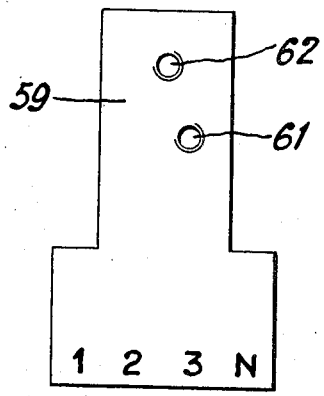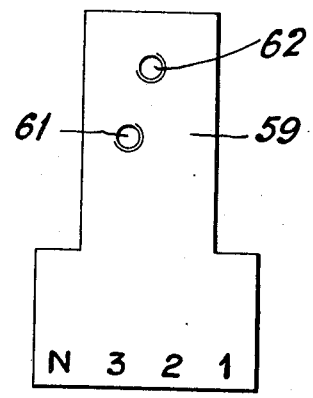

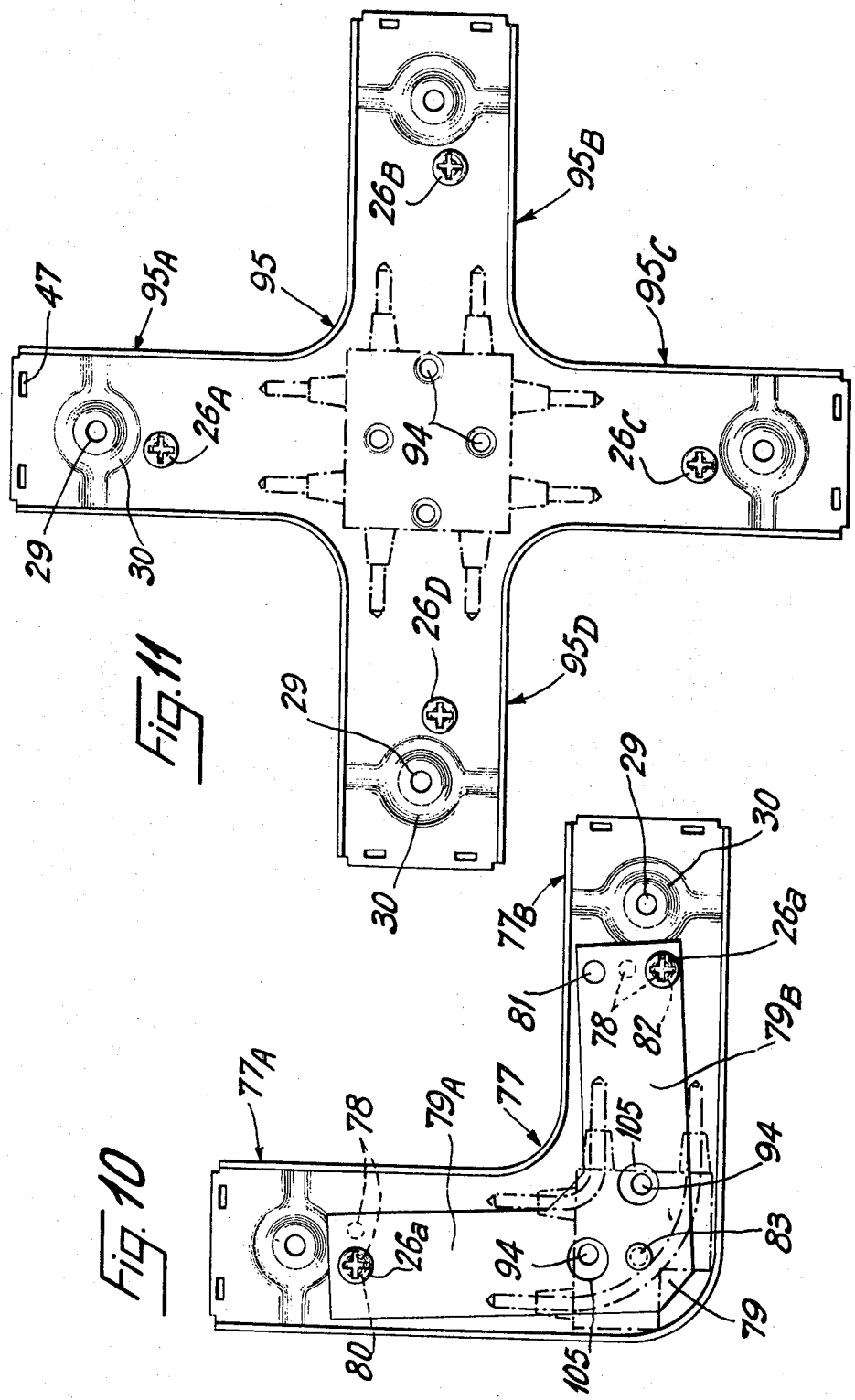

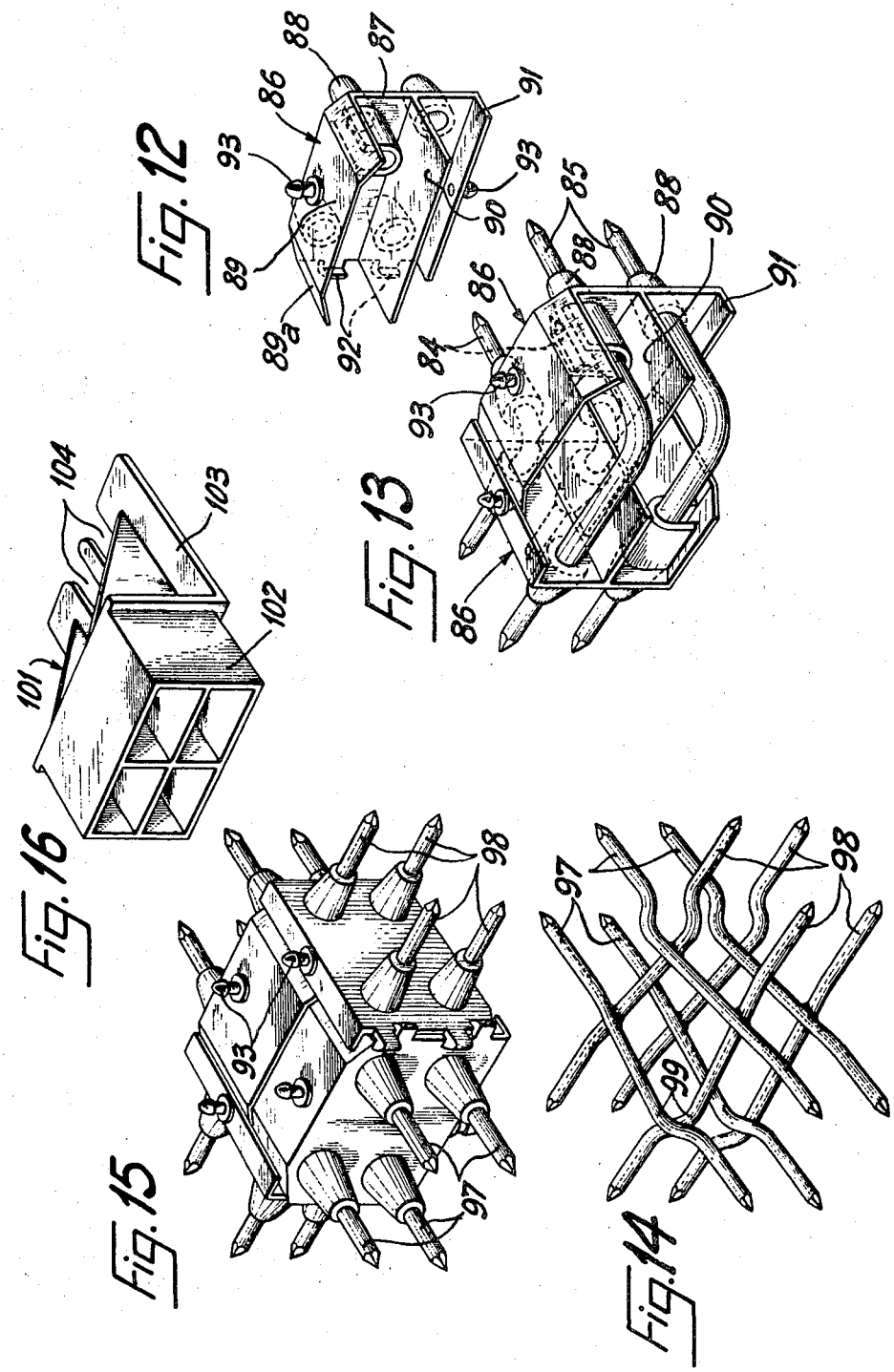

3,541,224
ELECTRICAL DISTRIBUTION SYSTEM INCLUDING RIGID TUBULAR CONDUIT LENGTHS CONNECTIBLE IN END-TO-END RELATION BY LINK MEMBERS
Jean Louis Andre Joly, Houilles, Yvelines, France, assignor to La Telemecanique Electrique, Nanterre, Hauts-de-Seine, France, a company of France
Filed Mar. 5, 1969, Ser. No. 804,647
Claims priority, application France, Mar. 12, 1968, 143,348
Int. Cl. H02g 3/36
U.S. Cl. 174—72                    15 Claims

ABSTRACT OF THE DISCLOSURE

An electrical distribution system comprises a number of linear conduit lengths which are to be aligned in correct phase relationship by intermediate link members, and the correct alignment is ensured by means of offset holes in the conduit lengths and link members respectively, which serves to accommodate fastening screws for temporary assembly of the conduit lengths prior to their electrical connection. Also described are a terminal connector and alternative junction-type link members.

---

An electrical distribution system, formed by the assembly of lengths of rigid tubular conduits with internal conductors has been disclosed by the U.S. Patent No. 3,207,839 of Sept. 21, 1965.

According to the design disclosed in that patent, the rectilinear conduit lengths, which have a generally symmetrical structure along their longitudinal axis, are provided with branch-off apertures through which means connecting apparatus can be introduced only in one particular fashion such that the internal conductors of each length of conduit become "polarised" with respect to the location of these apertures, that is to say assume a definite electrical role for the purpose of distribution.

In order to ensure the correct end-to-end assembly of these conduit lengths, i.e., to prevent the reversal of their ends and the modification of the electrical role of the internal conductors contained in the reversed conduit length, the above-mentioned invention provides each opposite end of these conduit lengths with mechanical coupling means based on fitting together shapes which are non-symmetrical with respect to the longitudinal plane of symmetry of the conduit lengths, these means being however arranged on each length in similar manner with respect to the two slides of this plane.

Thus, in a row of aligned conduit lengths, all the non-symmetrical fitting means must be situated on the same side of the plane of symmetry of the whole row such, that a length could not be linked to the preceding or following length if its ends were reversed.

According to the present invention there is provided an electrical distribution system including rigid tubular conduit lengths connectible in end-to-end relation by link members, in which each conduit length has a longitudinal plane of symmetry and is formed adjacent each end with a hole, both holes being assymmetrically offset from the plane of symmetry on the same side thereof, and in which each ling member includes a portion of channel form which is engageable around part of the periphery of adjacent ends of two conduit lengths to be linked, and is formed with a correspondingly assymmetrically offset hole whereby when the link and an adjacent channel member are in correct alignment the corresponding hole in the conduit length is superimposed over the hole in the link portion for the reception of fastening means.

The fastening means, in co-operation with its conduit aperture, thus constitutes the non-symmetrical means which ensures the correct positioning of the rectilinear conduit length with respect to the conduit link and also constitutes the means of provisional connection, at least, of the said conduit length to the conduit link, permitting connection of the internal conductors at leisure.

Conveniently, each hole in the conduit length is in the form of a locking aperture comprising a circular enlarged portion for the passage of the head of a screw and a narrow part pointing away from the corresponding end of the conduit length, and the hole in the channel portion is trapped to receive the screw.

The conduit links may be rectilinear, for the end-to-end connection of two rectilinear conduit lengths. They may also be of more complex configuration (cross, T, 90° or other bends).

Each link member, in order to provide an envelope for the end portions of the rectilinear conduit lengths, includes a lid portion which, in the assembled state, abuts edge to edge on the channel member and is fixed thereto by means of screws which, passing through the said lid, penetrate through suitable holes provided in the rectilinear conduits and engage tapped holes of the U-shaped envelope.

In the same way as in the above-mentioned patent, these complex conduit links comprise short conductor sections which ensure the connection of the internal conductors of the rectilinear conduit lengths joined by the link element.

In this prior construction, the various link-up possibilities increase the number of link elements or accessories required.

According to one feature of the present invention, the distribution system comprises, for the purpose of carrying out complex installations, only two additional link elements, i.e., a cross-link and a knee, and these enable all possible link-ups between rectilinear conduit lengths to be performed.

Conveniently, we provide a knee-shaped link member, each end of which is formed with two tapped holes offset from the centre line of that end portion, and which contains an L-shaped shutter pivoted to the base of the link member about an axis located at the point of intersection of the two longitudinal planes of symmetry of each limb of the member, one leg of the shutter being formed at its end with a centrally located hole, and the end of the other leg being formed with two holes spaced apart from each other by a distance equal to twice that between the tapped holes at the corresponding end of the link member, all the holes being located on a common radius relative to the pivot of the shutter.

The cross-link may consist of a cruciform link element, the channel portion of which is arranged so that each aligned pair of ends is equivalent to a continuous link member, and wherein the apertures at the ends of the arms of the cross are arranged symmetrically about one diagonal thereof. The electrical continuity of conductors through the link members may be effected by conductors supported by, and forming a block with, an insulator member. The insulator member may comprise an assembly of similar moulded insulating shells each of which comprises a plate perforated to permit passage of the conductors, and further includes a wall portion extending at right angles from the edge of the plate for a distance equal to at least half the length of that edge, while an adjacent edge of the plate is formed with assembly hooks extending in the same direction as the wall.

The cross-link element may be used in its given form for laying two cables which actually cross one another or for carrying out a T-junction, or for a lateral branch-off to one side or the other, but then the non-utilised branch of the cross must be closed by a blank.

It will be readily understood that by selecting one or the other of two adjacent branches of a cross-link, these different branch-connections can be carried out with only one type of cross-link, the "polarisation" of the conductor sections of the central block of the link always being suitable for the chosen link-up of the rectilinear conduit lengths with the two or three other utilised branches of the cross-link.

Each of the moulded insulating plates may include a central partition extending in plane parallel relation to the wall of the insulator, and the plate may further comprise, on the opposite edge from the wall, a flange extending parallel to the wall. Further, the ends of the wall portion may be inclined to its major length. For the knee link member, the insulator will comprise two moulded insulating shells assembled with their plates subtending an angle equal to that subtended by the knee, while for a cruciform link, the electrical insulator may comprise four moulded shells arranged in two pairs, with orthogonal plate portions, which are assembled at right angles. The insulating blocks may be provided with bosses in the form of snap fasteners for engagement with corresponding apertures in the corresponding link member. In the case of the cruciform link, these bosses may be arranged in lozenge configuration on those surfaces of the block parallel to the upper and lower surfaces of the link member.

Further components which complete the distribution system of the invention will now be described below.

The invention will now be described in greater detail with reference to various exemplary embodiments which are illustrated in the accompanying drawings, of which:

FIG. 1 is a perspective view of the end portions of two rectilinear conduit lengths and of means used for linking them.

FIG. 2 is a perspective view of a plate by means of which the end of a rectilinear conduit length can be closed.

FIG. 3 is a sectional view showing the link-up of two rectilinear conduit lengths, along the line III–III of FIG. 4.

FIG. 4 is a sectional view along the line IV–IV of FIG. 3.

FIGS. 5 and 6 are sections across the link along the lines V—V and VI—VI of FIG. 4.

FIG. 7 is an exploded view of the components arranged in a branch opening of a rectilinear conduit.

FIG. 8 is an exploded perspective view of a box by means of which the distribution system of the invention can be connected to a leading-in cable.

FIG. 9 is a longitudinal section of the box shown in FIG. 8.

FIGS. 10 and 11 show, in plan, the envelope portions of a knee and a cruciform link respectively.

FIG. 12 is a perspective view of an insulator shell.

FIG. 13 shows in perspective view two shells which constitute the block supporting the bent conductor sections, for insertion at the apex of a knee.

FIG. 14 shows in perspective view the conductor sections assembled in cross-formation which form part of the central block of a cruciform link element.

FIG. 15 shows the central block of a cruciform link element in perspective view.

FIG. 16 is a perspective view of a sealing insulator for transforming a cross-link into a T-junction.

FIG. 17 is a diagrammatic plan view of an assembly of aligned rectilinear conduit lengths.

FIGS. 18 and 19 show the two faces of a reference and fixing plate.

The distribution system of the invention is essentially composed of tubular conduit lengths A (FIGS. 1 to 6) which contain rigid parallel conductors 1. These conduits are mechanically assembled end-to-end, whereas the conductors are electrically connected to one another.

Each conduit length is formed by a U-shaped channel 2, closed by a sheet-metal strip 3 which is fixed to the channel by the crimping 4 of their engaging edges.

The strips 3 are shorter than the channels 2, so that the latter remain open at their end portions 2a, leaving the ends of the conductors 1 accessible.

As can be seen from the perspective representation in FIG. 1, the conduits A are meant to be fixed to the ceilings of rooms in which they are installed, so that the open sides of the channels 2 are turned down. The rigid conductors 1 are bared at their ends 5 and also in various places as indicated by the numeral 6, in order to enable current to be tapped through any of a number of apertures 7 provided in the strips 3.

To make this possible (see also FIG. 7), the bared portions 6 of the conductors 1—in the given example there are four conductors—are fixed in grooves 8 of two half-bearings 9 of dihedral shape, the bared portions 6 engaging ribs 8a formed on the opposite internal surfaces of these half-bearings and connecting the grooved portions 8.

Each pair of half-bearings 9, which are assembled by their bases 9a and by bosses 10 with the aid of cooperating dowels and recesses 11 and 12 respectively, accommodates a small hollow cylindrical component 15 in a circular recess 13 in which the end 14 of the component can pivot, while the other end 16 of the cylindrical component is journalled in the circular part of an opening 7 in the strip 3.

The component 15 which, in co-operation with the assembled half-bearings, holds the conductors 1 in place receives through the aperture 7 a connected, not shown here, which is provided with contacts adapted to project through the apertures 17 and which, after a quarter-rotation of the component 15 and the connector, ensures electrical connection with the bared portions 6 of the conductors 1.

The opening 7 has two diametrically opposed notches 18 and 19 of different size, so that the connector can only be introduced in the component 15 in one particular way. Moreover, the component 15 is provided with lugs 20 and 21 which permit its quarter-rotation only in one direction, so that each connector contact can only make contact with one of the conductors 1 in a particular way.

Not every one of the conductors 1 plays the same part. In the case of the four conductors shown in the drawings, three are phase conductors, whereas the fourth is a neutral conductor.

The above-described arrangement of connector and component 15 ensures that the connector contact which corresponds to the neutral conductor effectively establishes contact with the neutral conductor 1, provided that the conductor 1 of a tubular conduit length which serves as neutral conductor is effectively connected to the conductor 1 serving the same purpose of the preceding conduit length, in other words that all the conductors 1 occupying a predetermined position with respect to the components 15 are properly interconnected.

The means provided by the present invention, which will no be described, ensure this automatically consistent interconnection of the respective conductors.

To begin with, it should be noted that each cylindrical component 15 is formed with resilient lugs 20 which move in contact with the inner surface of the strip 3 and are provided with cavities 22 which co-operate with stamped bosses $23_1$, $23_2$, $23_3$ arranged around the corresponding aperture 7.

When the cavities 22 engage the bosses $23_1$, the component 15 is locked in the position allowing the connector to be introduced. If these cavities engage the bosses $23_2$, the connector is caught and locked, but its contacts are not as yet engaging the portions 6 of the conductor 1. When these cavities engage the bosses $23_3$, the electrical connection is made and the component 15 locked in its working position.

In order to ensure correct assembly between conduit lengths A, the bottom of the portion 2a of these lengths is provided with an aperture 25, placed non-symmetrically with respect to the longitudinal plane of symmetry of a conduit length A.

The apertures 25 of the two ends of one and the same conduit length A are situated to the left (FIG. 17) of the plane of symmetry X–Y for an observer going from X to Y, that is to say, always from the wide notch 18 towards the small notch 19 of aperture 7.

The apertures 25 are locking apertures, i.e. provided at their centre with a circular enlargement through which the heads of screws 26a and 26 can pass, and also comprising a narrow portion which prevents these screws from escaping.

The screws 26 engage tapped holes in the bottom 27a of a channel portion 27 of a rectilinear link, the position of these holes corresponding to the apertures 25. This channel portion of the link fits on the outside of the end portions 2a. It is provided, moreover, with two inward-pointing lugs 28 which engage the portions 25b of the aperture 25, in order to connect the portion 27 positively with the parts 2 of the two straight conduit lengths when the screws 26 have engaged the narrow parts 25a of the apertures 25 (see FIGURE 3) in such a way that these portions 2 can no longer move apart.

The part 27 is also provided with two tapped holes 29 in the centre of circular reinforcements 30. These tapped holes, in co-operation with screws 32, serve for fixing the lid 33 which completes the straight link element.

It will be noted that, in the same way as in the case of the other link elements described below, the lid 33 is practically identical with the channel portion 27, a fact which simplifies the manufacture of these link elements and, by reducing the length of the wings of the parts 27 and 33, improves the mechanical resistance of the link elements and thus the strength of the assembly of rectilinear conduit lengths.

Yet, this assembly is already accomplished when the screws 26 and the lugs 28 have been positioned in the way shown in FIGURE 3 and when the screws 26 have been tightened. At that stage the connection of the facing ends of the various conductors 1 by electrical connecting means 35 can be effected before the lid is applied.

The electrical connector comprises a moulded insulator 36 with four U-shaped channels 37, each containing a U-shaped conductor 38, the latter holding between its wings two nuts 39 in which the clamping screws 40 engage.

The assembly of the two conduit lengths is effected in that the electrical connector 35, which is carried by the conductors of one of the conduits, is pushed as far as possible on these conductors; when the conduit lengths A have been mouted by means of the screws 26, the connector is centred on the intermediate space between these lengths, and the screws 40 are tightened. An internal insulating lining 43 of the lid 33 prevents shorting between the screws 40 and the lid. The lining 43 is also integral with sheaths 44 which surround the screws 32 to prevent them from falling out and to avoid short-circuits which might be caused by the screws.

A tubuar conduit length 2–3, which forms the end of a line of conduits, has its end likewise equipped with a rectilinear link element 27–33 and an electrical connector 35 which prevents displacement of the free ends of the internal conductors, but, in this case, the link element is closed up by means of a plate 45 (FIGURE 2) whose lugs 46 engage the apertures 47 of the two parts 27 and 33.

The link-up device shown in FIGURES 8 and 9 permits the connection of the distribution system with a current lead-in cable 50 having four conductors.

This cable 50 enters the box formed by the bottom portion 51 and the lid 52, whose shape is that of a parallelepiped, through the circular aperture formed by juxtaposed cut-outs 53 and 54.

The box comprises a support 55, known per se, which is provided with four screw terminals. On one side the conductors 56 of the cable 50 and, on the other, short conductor sections 57 are connected to this support, the latter ensuring, in conjunction with an electrical connector 35, connection with the conductors of the first rectilinear conduit length A.

Mounting of this first conduit length A (the portion 2a) of which comprises an aperture 25 and an aperture 58 through which a screw 32 passes (see FIG. 1) is accomplished by means of a T-plate 59 (see also FIGS. 18 and 19) which has two tapped holes 61 and 62 corresponding respectively to each of these two apertures, whereas the bottom 51 has three holes: one in the longitudinal plane of symmetry corresponding to the tapped hole 62, and two others (63 and 64) symmetrical with respect to this plane and corresponding to the hole 61 in the position shown in FIGS. 18 and 19 of the T-plate 59 and also in the reverse position of this plate (FIG. 18), i.e., in the two feasible positions of the aperture 25 at the end of a tubular conduit length A, according to which end of the conduit length A is presented.

As shown in FIGS. 18 and 19, the T-plate 59 displays on its two surfaces the indices N, 1, 2, 3, the letters N being back-to-back. Thus, depending on which side of the plate 59 is presented, one or the other end of a tubular conduit length A can be fixed by means of the screws 70 in that it is clamped between this plate and bottom 51. However, this choice makes it necessary for the neutral conductor of the cable 50 to be connected to the junction terminal indicated by the letter N and determines the position of all the other tubular conduit lengths of the installation.

The neutral conductor of the cable 50 may be fixed on one side or the other side of the terminal block 55 and the bottom 51 comprises, on the side of the cable 50, three holes, namely two holes 71 and 72 near the edges of the said bottom portion and one hole 73 near one of the afore-mentioned holes.

If the neutral conductor of the installation is to be isolated, it will be sufficient to connect the metallic parts of the conduits A to earth by means of a terminal 74 which is fixed in one of the holes 71 or 72, preferably on the side away from the neutral conductor. If the neutral conductor is to be connected to earth, earthing is effected by means of the bent conductor 75 which has at its base a fixing lug 75a. Thus, the portion 75b of the bent conductor can be introduced in the junction terminal of the support 55 which corresponds to the neutral conductor N and, depending on which side of the support 55 this neutral conductor is positioned, the fixing bolt 76 of the bent conductor engages either the hole 73 (as shown) or the hole 72, as the case may be. If this bolt engages the hole 72, the terminal 74 must obviously be fixed in the hole 71.

FIG. 10 shows a knee which enables rectilinear tubular conduit lengths A to be joined to one or other of its ends while ensuring, in all possible combinations, the correct assembly of these lengths.

The channel portion 77 (corresponding to the part 27 of rectilinear link elements) comprises, apart from the tapped holes 29 for the assembly screws 32, in each of its branches 77A and 77B two symmetrically placed tapped holes 78 for engagement with the screws 26.

However, a flat L-shaped shutter 79 is pivotally mounted about an axis 83 situated at the point where the planes of symmetry of the legs meet. The leg 79A of the square is provided with a central hole 80, whereas the leg 79B has two symmetrically placed holes 81 and 82, all these holes having the same distance from the pivot 83 as the holes 78 and the angular distance of the holes 81 and 82 with respect to the pivot being twice the angular distance of the two holes 78, viewed from the pivot.

Thus, if the shutter 79 is in the position shown in the drawing, the holes 78 of both knee branches 77A and 77B which are near the outer edge of the knee will be accessible; joining of the two rectilinear conduit lengths A will then be effected with the apertures 25 always situated towards the outside of the knee and there will be continuity of the position of these apertures with respect to the longitudinal plane of symmetry which can be imagined to follow the curve of the knee.

If the square 79 is subjected to an angular displacement in clockwise direction with respect to the holes 78, the holes 81 and 82 will uncover those holes 78 which are situated near the inner edge of the knee and there will be again continuity of position for the apertures 25, excluding the possibility of reversing the ends of the rectilinear conduit lengths.

In order to effect electrical connection between the conductors to be connected by a knee, two electrical connectors 35 and a block illustrated in FIG. 13 must be used.

The latter comprises substantially four conductor sections, each formed by a length of insulated conductor and bent at right angles, with bared ends. The assembly comprises two short sections 84 on the inside and two long sections 85 on the outside.

These sections are assembled by means of two identical shells 86 one of which has ben illustrated on its own in FIG. 12.

Each shell of one moulded piece comprises a front plate 87 with four perforations for the conductors which are reinforced by hollow bosses 88.

The front plate 87 is integral with a wall 89 extending at light angles from one edge thereof. The ends of the wall are bent down as shown by the numeral 89a. The plate 87 is also formed integrally with a central insulating partition 90, a flange 91 and hooks 92.

Held by their assembled central partitions 90, two shells 86 are joined at right angles and engage one another by means of their hooks 92, whereas the flanges 91 cover the bent edges 89a. In this way, an assembly in the shape of a dihedral is obtained which holds the four conductors 84, 85 and is made rigid by the latter.

The wall portions 89 and the flanges 91 have apertures in which resilient press studs 93 can engage. By engaging apertures 94 of the part 77 (and apertures in the symmetrically opposite part, not shown here) through large openings 105 of the shutter 79, these studs enable the assembly shown in FIG. 13 to be fixed inside the knee. In this way dropping out of the assembly shown in FIG. 13 is avoided when the distribution system is fixed to the ceiling and the channel parts of the link elements are turned down; this facilitates the positioning of the electrical connectors 35.

In the cross-link element the upper half 95 of which is shown in FIG. 11 the legs 95A . . . 95D each comprise a screw 26 (denoted by the reference numerals 26A . . . 26D) in the corresponding leg. Going around this cross-link, the screws are alternately on one side and the other of the plane of symmetry of each leg, so that for the legs 95A and 95C on one hand, and 95B and 95D on the other, which are diametrically opposite in each case, the screws 26 are situated on the same side of the plane of symmetry for each pair of legs.

This link-element can therefore be adapted to either end of a conduit length A, and the conduit length beyond this element in prolongation of the first conduit element will automatically have the correct orientation.

To ensure electrical continuity along the two axes of the cross, it will be sufficient (see FIG. 14) to use in the direction of each of the axes four conductor sections 97 and 98 respectively which are substantially rectilinear and are bent only in the way indicated by the reference numeral 99, such bends preventing contact between the sections before they are insulated from one another.

However, in order to ensure electrical continuity, the conductors 97 and 98 must be interconnected in pairs.

Now, each pair of conductors, for example 97, which is situated in the same vertical plane, may be interconnected with one or other of the two pairs of conductors 98, likewise situated in parallel vertical planes.

Either mode of connection is feasible, but once the connection is chosen, the "polarisation" of the crossed conductor sections is determined or, in other words, the block of electrical continuity constituted by the conductor sections 97 and 98 and the insulators used for their assembly can only be placed in the cross-link in one position (or the position corresponding to a half-turn), but not in the position corresponding to a quarter-turn.

To make up such a block, the sections 97 and 98 are enclosed (FIG. 15) in a box formed by four shells 86 in pairs of two, assembled as shown in FIG. 13. In this way, a solid body with six surfaces is obtained which has, on its upper and lower surfaces, four holes 100 receiving studs 93. As can be seen in FIG. 11, the four studs on each face are arranged in lozenge configuration. They correspond to similarly arranged apertures provided in the bottom and the lid of the cross-link element.

Thus, the block (FIG. 15) of conductors 97 and 98 and of shells can occupy only one position when engaging the cross-link, or alternatively a position corresponding to a 180°-turn which would not change the "polarity" with regard to the conductor sections.

A cross-link therefore permits either the crossing of two lines of tubular conduit lengths, a departure to the right or the left from a line of conduit lengths starting from one pair of legs or from the other pair (i.e., with the apertures 25 to the right or to the left of the plane of symmetry of the rectilinear alignment of conduit lengths) or, finally, a T-bifurcation at the end of a straight line of conduits.

If only three legs are used, the fourth is closed up by an insulator such as shown in FIG. 16.

This insulator blank 101 comprises a box 102 wtih four compartments and a fixing lug 103 having two slots 104 of which one or the other is used to receive the screw 26 of the corresponding leg 95A–95D of the cross-link element, according to whether this screw is situated on the right or the left of the plane of symmetry of the said leg.

Moreover, a plate 45 (FIG. 2) is capable of completely shuttering the end of the unused leg because it can engage apertures 47 provided in the ends of these legs.

It will be seen from the foregoing description that the invention permits simplification and improvement of electrical distribution systems. It will also be seen that the number of conduit lengths having to be kept in stock can be reduced, and this avoids uncertainties in delivery when supplying components for installations of varying degrees of complexity.

Obviously, modifications may be made to the embodiments described here, especially by substituting equivalent technical means, without thereby departing from the scope of the present invention.

What I claim is:

1. An electrical distribution system comprising in combination:
   (a) a plurality of rigid tubular conduit lengths each of which has a longitudinal plane of symmetry and is formed adjacent each end with a hole formed as a locking aperture comprising a circular enlarged portion for the passage of the head of a screw and a narrow portion pointing away from the corresponding end of said conduit length, both said holes being asymmetrically offset from said plane of symmetry on the same side thereof, (b) link members each of which includes a portion of channel form engaging in use around part of the periphery of adjacent ends of two conduit lengths, and is formed at each end with an asymmetrically offset hole and tapped to receive said screw corresponding to said offset holes in said conduit lengths when correctly aligned, and (c) fastening screws engaging in superimposed holes in said two conduit lengths and a corresponding link member thereby securing together said correctly aligned conduit lengths.

2. A distribution system according to claim 1 wherein the base of said channel portion is formed with a projection engaging in the aperture in said conduit length on the side thereof opposite to the narrow portion of said aperture.

3. A distribution system according to claim 1 wherein a lid is provided to complement said channel portion to form an envelope and is fastened to said channel portion by means of screws passing through said lid, through corresponding holes in said conduit length and engaging in tapped holes provided in the base of said channel portion.

4. A distribution system according to claim 3 wherein said channel portion and said lid are of identical shape and abut edge-to-edge laterally of said conduit lengths.

5. A distribution system according to claim 3 wherein said channel portion and said lid are provided at each end with transversely aligned apertures co-operating with corresponding lugs formed on a blank whereby the latter is held in position to close the end of said link element.

6. A distribution system according to claim 1 including:

(a) a box for connection to a lead-in cable, said box containing a terminal block and having a base portion formed with a pair of holes each offset from a central line of said base portion by an amount corresponding to the offset of said holes in the ends of said conduit lengths, said box being secured to a conduit length by means of a screw passing through one of said apertures, and (b) a reversible indicator plate, both faces of which are provided with indices which correspond to conductors located within said conduit, and which are aligned with appropriate terminals of said terminal block according to whether said indicator plate is in one or other of its reversible positions, said indicator plate being formed with an asymmetrically located tapped hole whereby selection of the correct hole in said base portion is ensured by appropriate fitting of said indicator plate.

7. A distribution system according to claim 1 including a knee-shaped link member, each end of which is formed with two tapped holes offset from the centre line of that end portion, and which contains an L-shaped shutter pivoted to the base of the link member about an axis located at the point of intersection of the two longitudinal planes of symmetry of each limb of the member, one leg of the shutter being formed at its end with a centrally located hole, and the end of the other leg being formed with two holes spaced apart from each other by a distance equal to twice that between the tapped holes at the corresponding end of the link member, all the holes being located on a common radius relative to the pivot of the shutter.

8. A distribution system according to claim 1 including at least one cruciform link element, the channel portion of which is arranged so that each aligned pair of ends is equivalent to a continuous link member, and wherein the apertures at the ends of the arms of the cross are arranged symmetrically about one diagonal thereof.

9. A distribution system according to claim 1 wherein conductors are supported by and form a block with an insulator member, said insulator member comprising an assembly of similar moulded insulating shells each of which comprises a plate perforated to permit passage of said conductors, and further includes a wall portion extending at right angles from the edge of said plate for a distance equal to at least half the length of that edge, while an adjacent edge of said plate is formed with assembly hooks extending in the same direction as the walls.

10. A distribution system according to claim 9 wherein the plate includes a central partition extending in plane parallel relation to the wall.

11. A distribution system according to claim 10 wherein the plate further comprises on the opposite edge from the wall, a flange extending parallel to the wall, and in which the ends of the wall portion are inclined to its major length.

12. A distribution system according to claim 11 wherein the insulator comprises two moulded insulating shells, assembled with their plates subtending an angle equal to that subtended by the knee.

13. A distribution system according to claim 11 wherein the electrical insulator comprises four moulded shells arranged in two pairs, with orthogonal plate portions, which are assembled at right angles.

14. A distribution system according to claim 11 wherein the insulating blocks are provided with bosses in the form of snap fasteners, and engaged in corresponding apertures in the corresponding link member.

15. A distribution system according to claim 14 wherein the bosses are arranged in lozenge configuration on those surfaces of the block parallel to the upper and lower surfaces of the link member.

References Cited

UNITED STATES PATENTS 3,207,938   9/1965   Joly.

DARRELL L. CLAY, Primary Examiner.

U.S. Cl. X.R.

174—48, 68; 339—22.